(12) United States Patent
Reitsch, Jr.

(10) Patent No.: US 6,186,073 B1
(45) Date of Patent: Feb. 13, 2001

(54) PUSHER ROLLER ASSEMBLY FOR A CAR WASH CONVEYOR

(75) Inventor: Gilbert J. Reitsch, Jr., Clarkston, MI (US)

(73) Assignee: Peco Corporation, Auburn Hills, MI (US)

(*) Notice: Under 35 U.S.C. 154(b), the term of this patent shall be extended for 0 days.

(21) Appl. No.: 09/260,321

(22) Filed: Mar. 1, 1999

(51) Int. Cl.⁷ .................................................. B61B 13/12
(52) U.S. Cl. .......................... 104/172.1; 104/172.3; 104/162; 197/732; 197/718
(58) Field of Search .............. 104/172.1, 172.3, 104/162; 198/732, 718

(56) References Cited

U.S. PATENT DOCUMENTS

| 3,568,606 | * | 3/1971 | Grant | 104/172 |
| 3,596,605 | * | 8/1971 | Shelstad | 104/172 |
| 4,374,496 | * | 2/1983 | Hanna | 104/172 B |
| 4,873,929 | * | 10/1989 | Witecki | 104/172.3 |
| 5,140,910 | * | 8/1992 | Welter | 104/162 |

* cited by examiner

Primary Examiner—S. Joseph Morano
Assistant Examiner—Frantz F. Jules
(74) Attorney, Agent, or Firm—John R. Benefiel

(57) ABSTRACT

A roller assembly for car wash conveyors having three pairs of pusher rollers on the upper end of a conveyor roller bar in order to reduce and make more uniform the roller wear. The roller pairs are arranged to respectively engage the upper, intermediate and lower tracks of the conveyor. The pairs of pusher rollers are each mounted on one of three parallel shafts arranged in a triangular pattern each roller in each pair confined between sets of two plates having holes receiving the shafts which are welded thereto. Two of the shafts are welded to the upper end of the roller bar.

18 Claims, 4 Drawing Sheets

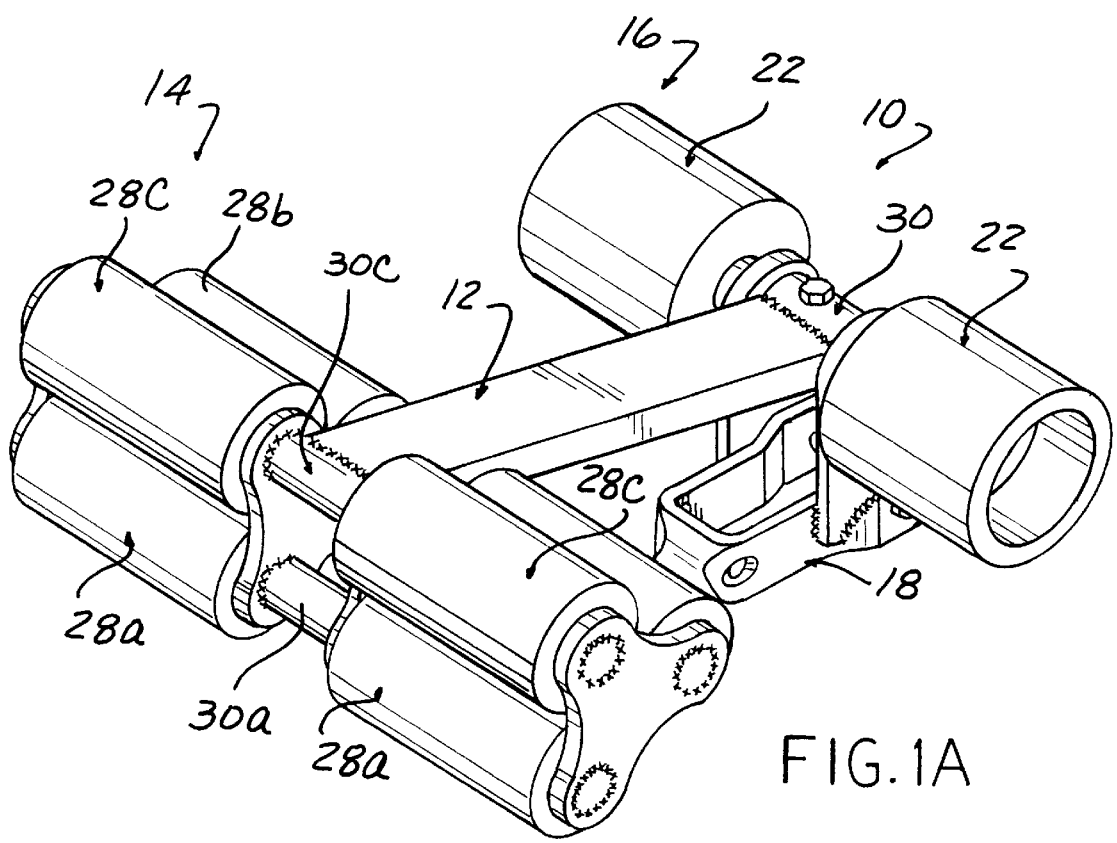
FIG.1A
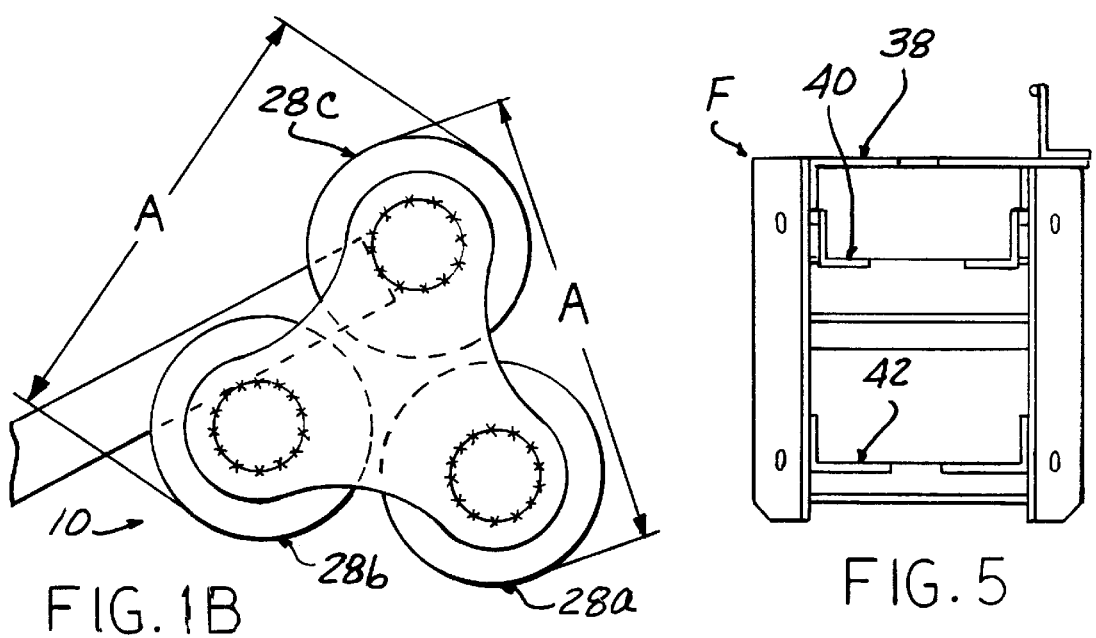
FIG.1B
FIG.5

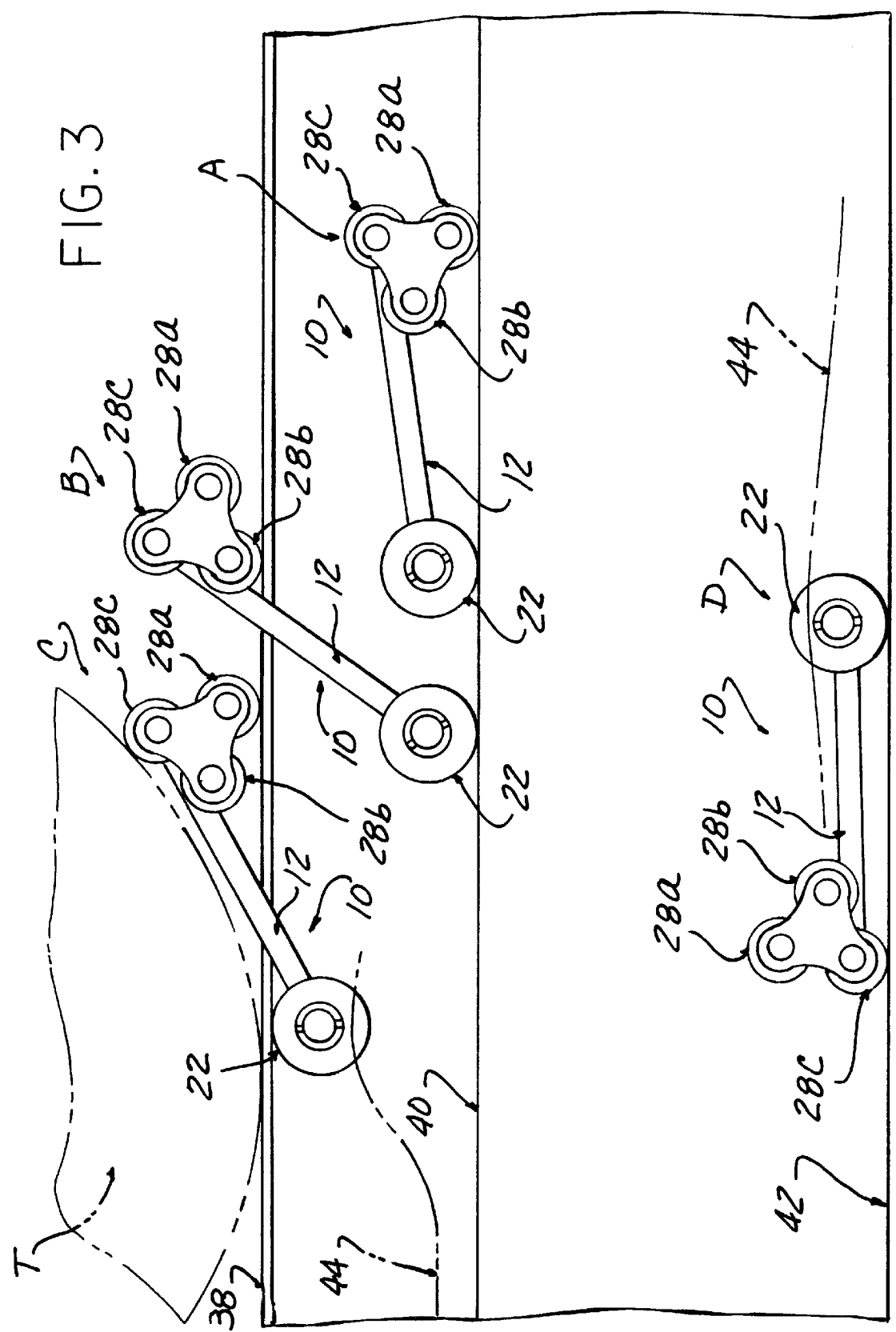

PUSHER ROLLER ASSEMBLY FOR A CAR WASH CONVEYOR

BACKGROUND OF THE INVENTION

This invention concerns automotive car wash conveyors, and more particularly pusher roller assemblies used in three track type conveyors.

Automatic car washes use conveyors for pulling each car along a track extending through an array of car washing equipment disposed along the conveyor.

One design which has been widely adopted uses a series of roller assemblies attached to an endless recirculated chain extending around a three track structure extending the length of the conveyor.

The roller assemblies move forwardly down an intermediate track and return on a lower track, the chain circulating along both tracks. When a car advances onto the upper track and a pusher roller assembly is needed, a forked ramp is raised from the intermediate track to intercept and guide an upper pusher roller set of the roller assembly onto an upper slotted track along which the car tires roll. An elongated roller bar has the pusher roller set mounted thereon and extends down through the slot to the chain. A set of idler rollers are mounted to the other end of the dog to provide rolling support for the chain and roller assemblies on the intermediate and lower return tracks.

The pusher roller set rolls along the upper track and also engages the car tire. Two pusher roller pairs are provided, one for engaging the car tire and the other for engaging the upper track.

In early versions of this design, the tire engaging and track engaging rollers were provided by stepped diameters of a common roller as seen in U.S. Pat. No. Re 30,026 reissued on Jun. 12, 1979 for a "Vehicle Conveyor".

Due to problems with wide tires, the pusher roller sets are now typically provided with separately mounted pairs of rollers, each roller of the pairs cantilevered out from one side of the dog, so that six separate rollers are included in each roller assembly.

An example of this arrangement is shown in U.S. Pat. No. 4,873,929 issued on Oct. 17, 1989 for a "Pusher Unit" U.S. Pat. No. 4,314,496 issued on Feb. 22, 1983 for a "Vehicle Conveyor", and U.S. Pat. No. 4,930,424 issued on Jun. 5, 1990 for a "Conveyor Chain Guide".

An improved design for the separately mounted pusher rollers is described in U.S. Pat. No. 4,864,936 issued on Sep. 12, 1989 to the assignee of the present application, which design has proved to have provided a long wear life roller assembly.

In these prior conveyors, the rollers are constructed of a durable molded plastic such as urethane, and are mounted on shafts cantilevered out from each side of the roller bar. The ends of the rollers are hollowed out to enclose the heads of bolts used to hold the rollers in place. This arrangement has created a tendency for the rollers to "grow" in length due to the pressure of the engagement on the unconfined outer end of the roller. The rollers may jam between the track sides as a result of their increased length.

The upper pusher rollers are of smaller diameter than the lower idler rollers, and one roller pair in the pusher set runs along all three tracks.

Due to the small diameter of those rollers, early wearout of the pusher rollers has been a problem, which is a major maintenance burden, as replacement often requires disassembly of the chain and roller assemblies. One set of rollers is used to engage the forked ramp, and if excessive wear of that roller set has occurred, proper engagement with the ramp may not be possible, rendering that roller assembly inoperative. This is a particular problem where "coning" wear of the roller creates a tendency for the rollers to track to one side in ascending the fork ramp. As the rollers are typically not replaced until complete wearout has occurred, further maintenance often must be done as a result of roller wearout.

The construction of the prior art roller assemblies has also led to high manufacturing costs, and also misalignments of the rollers in each pair is common.

Applicant has heretofore also sold roller assemblies using three pairs of pusher rollers in attempt to reduce wear, but this design involved two sets of rollers rolling on the upper track when not engaged such that no real wear reduction resulted.

Accordingly, it is an object of the present invention to provide a pusher roller assembly of the type described in which the frequency of roller replacement required as a result of roller wear is reduced.

It is another object of the present invention is to provide such a pusher roller assembly which may be manufactured at low cost and insures good alignment of the rollers in each pair.

SUMMARY OF THE INVENTION

The above objects of the invention as well as other objects which will become apparent upon a reading of the following specification and claims are achieved by having three roller pairs mounted to the upper end of a roller bar which also has a larger diameter idler roller mounted to the lower end in conventional fashion.

The three roller pairs have their rotational axes arranged in a triangular pattern, located so that each roller pair separately rides on a respective one of the upper, intermediate, and lower return tracks so as to provide a three way sharing of the pusher wear roller caused by running along the three track levels. This substantially extends the wear life of all of the upper pusher rollers, and makes the wear of each roller more uniform. In particular, the wear of the roller pair engaging the forked ramp is minimized, such that reliable engagement is achieved over an extended service life.

The upper pusher roller set is of welded construction, comprised of four identical end plates, arranged in spaced apart pairs on either side of the upper end of the roller bar. Three identical shafts extend through aligned holes in each of the four end plates. Six identical rollers are rotatably mounted in properly aligned pairs on the respective shafts, located intermediate the end plates. The rollers are not counterbored and are confined at their ends to positively prevent any increase in length during service.

The end plates are welded to each of the shafts, and two of the shafts are welded to the roller bar upper end to secure the upper roller assembly to the roller bar, providing a low cost yet precision construction, allowing economic replacement of the entire roller assembly rather than replacement of the individual rollers.

The overall depth of the pusher roller assembly is preferably limited to allow use on existing conveyor track ways designed for the prior two roller pusher sets.

DESCRIPTION OF THE DRAWINGS

FIG. 1A is an enlarged perspective view of the pusher roller shown in FIG. 1 in a reversed position.

FIG. 1B is an enlarged end view of the pusher roller assembly.

FIG. 3 is a simplified side elevational view of the roller assembly in the various operative portions assumed on the conveyor tracks, a portion of the tracks and vehicle tire shown diagramatically.

FIG. 5 is an end view of the conveyor track structure.

DETAILED DESCRIPTION

In the following detailed description, certain specific terminology will be employed for the sake of clarity and a particular embodiment described in accordance with the requirements of 35 USC 112, but it is to be understood that the same is not intended to be limiting and should not be so construed inasmuch as the invention is capable of taking many forms and variations within the scope of the appended claims.

Figures 1, 2:
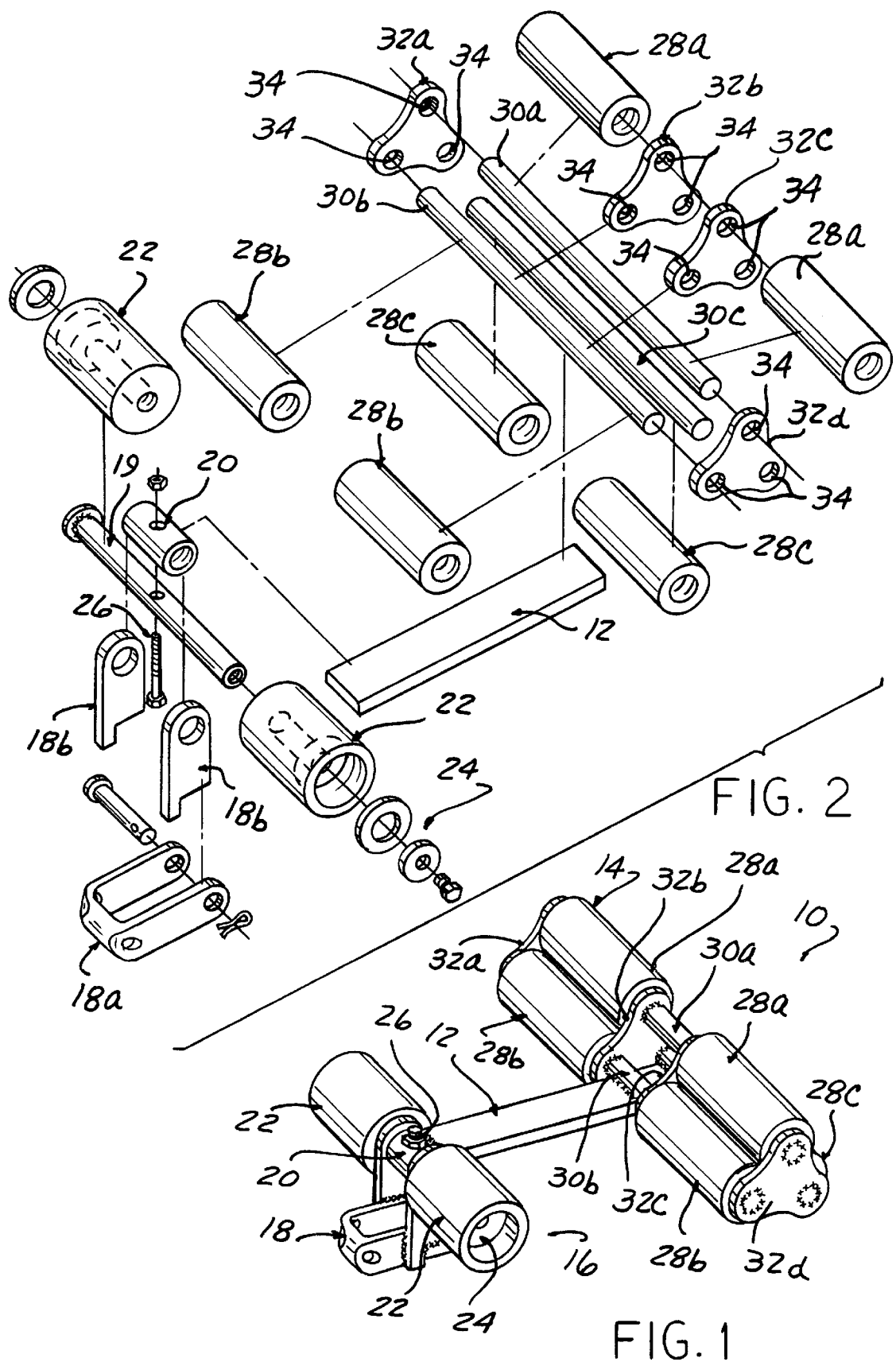
FIG. 1 is a perspective view of the pusher roller assembly according to the invention.
FIG. 2 is an exploded perspective view of the components of the roller assembly shown in FIGS. 1 and 1A.

Referring to FIGS. 1 and 2, the conveyor roller assembly 10 according to the present invention includes an elongated roller bar 12, sometimes also referred to as a dog having a pusher roller set 14 mounted to its upper end, and an idler roller set 16 mounted to its lower end.

The lower end of the roller bar 12 has a chain connector 18 comprised of U-piece 18A and side plates 18B rotatably supported on a shaft 19 received in a sleeve 20 welded to the lower end of the roller bar 12. A pair of large diameter urethane idler rollers 22 are rotatably supported on the shaft 19, retained with a bolt and washer set 24, a cross bolt 26 preventing rotation of the shaft 19 in the sleeve 20.

The idler roller set 16 is of conventional design, and is well known to those skilled in the art.

The pusher roller set 14 comprises three parallel pairs of straight sided molded urethane rollers 28A, 28B, 28C having their rotational axes arranged in an equilateral triangular pattern. Each roller in the pairs 28A, 28B, 28C are supported on a respective side of the upper end of the dog 12. The rotational axes are defined by three identical shafts 30A, 30B, 30C, two of the shafts 30B, 30C overlying and welded extending across the upper end of the roller bar 12.

The pusher rollers 28A, 28B, 28C are individually confined by four identical aligned plates 32A, 32B, 32C, 32D, each of generally triangular shape and having three holes 34 formed therein to receive a respective axle shaft 30A, 30B, 30C.

Welds around each hole 34 fix the plates 32A–D to the shafts 30A–C

Figure 4:
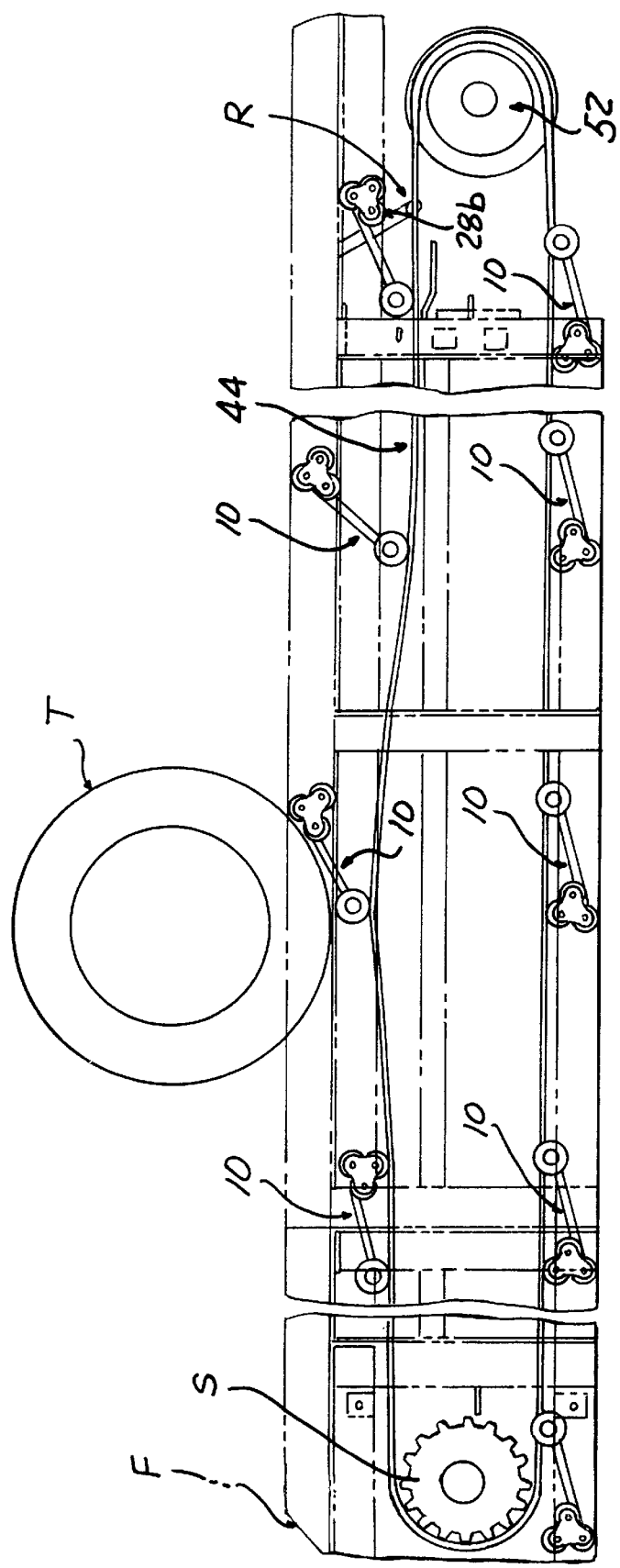
FIG. 4 is a fragmentary side view of a conveyor using the roller assembly of the present invention.

Referring to FIGS. 3 and 4, a representation of the several positions assumed by the roller assembly 10 in traversing the conveyor tracks is illustrated. The roller assembly 10 is contemplated for use with a conventional car wash conveyor of the well known type, and hence a detailed description is not here set forth.

Suffice it to say, that such conveyors have a multilevel track frame F providing three track levels, an upper track 38 on which the car tires T roll when engaged by the pusher roller set 14, an intermediate track 40 which receives the roller assemblies 10 when the pusher sets 14 are not ramped up to upper track 38; and a lower or return track 42 down which the roller assemblies 10 pass in being returned to the forward end of the conveyor (see also FIG. 5).

The roller assemblies 10 are connected to an endless chain 44 circulating along the intermediate and lower tracks 40, 42 passing around sprockets S1, S2 at either end of the conveyor. When a roller assembly 10 is to be activated, a pivoting ramp R is swung up engaging roller pairs 28A to cause a pusher roller set 14 to be cammed up from the idle position "A" to the upper track 38, where it assumes the activated but unengaged position "B". Upon engaging a vehicle tire T, the idler rollers 22 are pulled up against the undersurface of upper track 38 to assume position "C", causing the roller bar 12 to be more inclined due to the resistance created by the tire T. Typically, several unengaged roller assemblies 10 are caused to be swung up behind an engaged roller assembly 10 as a safety measure. Thus, each roller assembly 10 will have a substantial period of use traversing the upper track 38 while not engaging a vehicle tire T.

At the end of the conveyor, the roller assemblies 10 proceed back along the lowest track 42 in a reverse position "D".

According to the present invention, the pusher roller set comprises three pairs of rollers 28A–C rather than two, and these pusher roller sets are each arranged to respectively engage one of the tracks 38, 40, 42 to more uniformly distribute the wear.

The pusher roller set pairs 28A–C are arranged so that each one of the pairs engages a respective one of the tracks 38, 40, 42 when the roller assembly 10 is not in engagement with a vehicle tire T.

That is, roller pair 28B runs an upper track 38, roller pair 28A runs on intermediate track 40, and roller pair 28C runs on lower return track 42.

When a tire T is engaged, a more pronounced backward tilting of the dog 12 brings roller pair 28A into engagement with the upper track 38 and roller pair 28C engages the tire T.

This result is produced by arranging one of the pusher roller pairs 28C, to protrude forwardly of the front face of the roller bar 12, while a second roller pair 28B is disposed below and slightly recessed behind the front surface of the roller bar 12, and the third 28A is located well behind both directly to the rear of the roller bar 12.

Thus, when the assembly 10 is inclined slightly to the rear from the vertical (position "B") roller pair 28B engages track 38. When the roller assembly 10 is lying completely over to the right (position "A") the rearmost roller pair 28A engages intermediate track 40.

When the roller assembly is lying completely over to the left (position "D"), roller pair 28C engages lower return track 42.

Finally, when a tire T is engaged and the roller assembly is tilted more to the rear (position "C"), roller pair 28C engages the tire T and roller pair 28A engages the upper track 38.

Thus, a more uniform wear of the pusher rollers results, and a reduced rate of wear of all three pusher rollers is achieved, to reduce maintenance. In particular, the ramp engaging roller pair 28B will have much reduced wear, making the proper engagement therewith much more likely. The solid construction of the pusher rollers minimizes axial growth and coning wear patterns.

As seen in FIG. 1B, the overall dimension "A" across roller pairs 28A and 28C, and across roller pairs 28B and 28C is preferably around 3.69 inches so as to fit existing conveyors and this allow the roller assemblies 10 to replace prior art roller assemblies without modification.

What is claimed is:

1. A roller assembly in combination with a car wash conveyor of the type having three levels of track sections, an upper track section on which a car to be washed runs, a lower return track, and an intermediate track section, and a recirculated chain attached to said roller assembly and carrying said roller assembly along said conveyor, said roller assembly moved along said upper track section when elevated by activation of a roller control to enable engagement with a car tire to advance said car to be washed down the length of said conveyor, said roller assembly returned on said lower track section to said entrance end of said conveyor after advancing said car down the length of said conveyor, said roller assembly moved down said intermediate track section when not elevated by activation of said roller control, said roller assembly comprising:

an elongated bar having opposite ends;

an idler roller set mounted on one of said opposite ends of said bar, said idler roller set including a pair of aligned rollers each roller rotatably mounted projecting to a respective side of said elongated bar one end;

a pusher roller set on an end of said elongated bar opposite said one end, said pusher roller set including three parallel pairs of aligned rollers, each roller in each parallel pair of aligned rollers rotatably mounted and projecting to a respective side of said elongated bar;

said parallel pairs of aligned rollers in said pusher roller set having respective axes of rotation arranged in a triangular pattern, and each of said parallel pairs of aligned rollers in said pusher roller set arranged to engage a respective one of said upper, lower, and intermediate conveyor track sections during movement of said roller assembly along said track sections by said recirculated chain.

2. The roller assembly according to claim 1 wherein said roller pairs are arranged so that upon activation of said roller control and engagement of said roller assembly with a vehicle tire on said upper track section, one of said parallel pairs of aligned rollers in said pusher roller set engages said tire and a second pair of aligned rollers in said pusher roller set engages said upper track.

3. The roller assembly according to claim 1 wherein one of said parallel pairs of aligned rollers in said pusher roller set is located to protrude forwardly of a forward face of said elongated bar when positioned to engage a vehicle tire, and the other of said three parallel pairs of aligned rollers are located behind said one pair of rollers.

4. The roller assembly according to claim 3 wherein said shafts are arranged in an equilateral triangular pattern.

5. The roller assembly according to claim 4 wherein a second pusher roller pair is located below said one roller pair with said roller assembly elevated and said elongated bar extending upwardly through said upper track to position said one pusher roller pair to engage a vehicle tire on said upper track section, said second pusher roller pair, positioned above and out of engagement with said upper track section, and a third pusher roller pair is located behind and below said one and said second of said pusher roller pairs and in engagement with said conveyor upper track section.

6. The roller assembly according to claim 1 wherein each parallel pair of aligned rollers in said pusher roller set is mounted on a respective shaft extending within both rollers in each pair, each shaft extending across an upper end of said elongated bar.

7. The roller assembly according to claim 6 wherein each roller in said parallel pairs of aligned rollers in said pusher roller set are confined between one of two sets of spaced apart plates each set of plates on a respective side of said elongated bar, said three shafts having opposite ends, one on each side of said elongated bar, each shaft welded to each of said plates.

8. The roller assembly according to claim 7 wherein each of said shafts are identical and each of said plates are identical.

9. The roller assembly according to claim 7 wherein each of said shafts are received in respective openings in each of said plates.

10. The roller assembly according to claim 7 wherein two of said shafts have an intermediate portion overlying and welded to said upper end of said elongated bar.

11. The roller assembly according to claim 1 wherein each of said rollers in said pusher roller set is of the same diameter.

12. The roller assembly according to claim 1 wherein each of said rollers in said idler and pusher roller set is constructed of plastic.

13. The roller assembly according to claim 1 wherein said conveyor control engages the same pair of aligned rollers which run on the intermediate track section to elevate said roller assembly when said conveyor control is not activated.

14. A roller assembly for a car wash conveyor of the type having three levels of track sections, and a recirculated chain for carrying a roller assembly along said conveyor, said roller assembly comprising:

an elongated bar having a lower end and an opposite upper end;

an idler roller set mounted on said lower end of said bar, said idler roller set including a pair of aligned rollers, each roller in said pair of aligned rollers rotatably mounted to said bar and projecting to a respective side of said elongated bar lower end; and, a pusher roller set on said opposite upper end of said elongated bar, said pusher roller set including a plurality of parallel pairs of aligned rollers, each roller in each parallel pair of aligned rollers rotatably mounted and projecting to a respective side of said elongated bar, each pair of rollers in said push roller set mounted on a respective shaft extending within both rollers in each pair, each shaft extending across said upper end of said elongated bar to locate each end thereof projecting to a respective side of said elongate bar;

each roller in each parallel pair of aligned rollers in said pusher roller set closely confined between one of two sets of spaced apart plates, each plate set located on a respective side of said elongated bar, each shaft welded to each one of said plates; and each of said shafts identical to each other and each of said plates identical to each other, each of said shafts received in respective openings in each of said plates.

15. A roller assembly for a car wash conveyor of the type having three levels of track sections, and a recirculated chain for carrying roller assemblies along said conveyor, said roller assembly comprising:

an elongated bar having a lower end and an opposite upper end;

an idler roller set mounted on said lower end of said bar, said idler roller set including a pair of aligned rollers each roller in said pair of aligned rollers rotatable mounted to said bar and projecting to a respective side of said elongated bar lower end; and, a pusher roller set on said opposite upper end of said elongated bar, said pusher roller set including a plurality of parallel pairs of aligned rollers, each roller in each parallel pair of aligned rollers rotatable mounted and projecting to a respective side of said elongated bar, each pair of rollers in said push roller set mounted on a respective shaft extending within both rollers in each pair, each shaft extending across said upper end of said elongated bar to locate each end thereof projecting to a respective side of said elongate bar;

each roller in each parallel pair of aligned rollers in said pusher roller set closely confined between one of two sets of spaced apart plates, each plate set located on a respective side of said elongated bar, each shaft welded to each one of said plates; and, two of said shafts having an intermediate portion overlying and welded to said upper end of said elongated bar.

16. A roller assembly for a car wash conveyor of the type having three levels of track sections, and a recirculated chain for carrying a roller assembly along said conveyor, said roller assembly comprising:

an elongated bar having a lower end and an opposite upper end;

an idler roller set mounted on said lower end of said bar, said idler roller set including a pair of aligned rollers, each roller in said pair of aligned rollers rotatably mounted to said bar and projecting to a respective side of said elongated bar lower end; and, a pusher roller set on said opposite upper end of said elongated bar, said pusher roller set including a plurality of parallel pairs of aligned rollers, each roller in each parallel pair of aligned rollers rotatably mounted and projecting to a respective side of said elongated bar, each pair of rollers in said push roller set mounted on a respective shaft extending within both rollers in each pair, each shaft extending across said upper end of said elongated bar to locate each end thereof projecting to a respective side of said elongate bar;

each roller in each parallel pair of aligned rollers in said pusher roller set closely confined between one of two sets of spaced apart plates, each plate set located on a respective side of said elongated bar welded to each one of said plates; and, the overall dimension across two sets of pairs of rollers is less than about 3.69 inches to be able to be fit to preexisting conveyors.

17. The roller assembly according to claim 16 wherein each of said rollers in said idler and pusher roller set is constructed of plastic.

18. The roller assembly according to claim 16 wherein three pairs of rollers are included in said pusher roller set.

* * * * *

UNITED STATES PATENT AND TRADEMARK OFFICE
CERTIFICATE OF CORRECTION

PATENT NO. : 6,186,073 B1
DATED : February 13, 2001
INVENTOR(S) : Gilbert J. Reitsch, Jr.

It is certified that error appears in the above-identified patent and that said Letters Patent is hereby corrected as shown below:

Column 3,
Line 47, after "12" insert -- and welded thereto --.

Column 5,
Line 29, after "respective side" insert -- , each roller in each parallel pair of aligned rollers rotatably mounted and projecting to a respective side --.

Column 6,
Line 65, delete "rotatable" insert therefor -- rotatably --.

Column 8,
Line 17, after "elongated bar" insert -- , --.

Signed and Sealed this

Nineteenth Day of March, 2002

Attest:

JAMES E. ROGAN
Attesting Officer
Director of the United States Patent and Trademark Office